United States Patent Office 3,463,803
Patented Aug. 26, 1969

3,463,803
POLYHALOETHYL AND POLYHALOVINYL SULFINATE AND THIOSULFINATE ESTERS
Paul C. Aichenegg, Prairie Village, Kans., assignor to Chemagro Corporation, Kansas City, Mo., a corporation of New York
No Drawing. Continuation-in-part of application Ser. No. 584,104, Oct. 4, 1966. This application Oct. 28, 1966, Ser. No. 590,212
Int. Cl. C07c *143/68;* A01h *9/14*
U.S. Cl. 260—453                    15 Claims

ABSTRACT OF THE DISCLOSURE

Compounds are prepared having a formula selected from the group consisting of (1)
$$R_1S\!-\!OR_2$$
with a carbonyl (=O) on S and (2)
$$R_1S\!-\!SR_2$$
with a carbonyl (=O) on S where $R_1$ is a tri to tetrahaloetyl or di to trihalovinyl and $R_2$ is alkyl, mono, di or tri halogen lower alkyl, phenyl, alkylphenyl, mono, di or trihalophenyl, monohalogen monomethyl phenyl, the halogen atoms of the compound being chlorine or bromine. The compounds are useful in killing fungi, nematodes, insects, undesired plants and are also useful as defoliants and dessicants.

---

The present application is a continuation-in-part of application Ser. No. 584,104, filed Oct. 4, 1966.

It is an object of the present invention to prepare novel sulfinates.

Another object is to prepare novel thiosulfinates.

Another object is to prepare sulfinate which are useful in the agricultural field.

A further object is to prepare novel nematocides, fungicides, defoliants, desiccants, herbicides and insecticides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formulae $$R_1\!-\!\overset{O}{\underset{\|}{S}}OR_2$$

I and $$R_1\!-\!\overset{O}{\underset{\|}{S}}\!-\!S\!-\!R_2$$

II where $R_1$ is polyhaloethyl or polyhalovinyl and $R_2$ is alkyl, haloalkyl, aryl or haloaryl. The halogens are either chlorine or bromine. When $R_1$ is polyhaloethyl there are 3 or 4 halogen atoms and when $R_1$ is polyhalovinyl there are 2 or 3 halogen atoms. The compounds of the present invention are prepared by the following general procedure $$R_1SCl + R_2OH \longrightarrow R_1SOR_2 + HCl$$

I (with carbonyls =O on S)

$$R_1SCl + R_2SH \longrightarrow R_1SSR_2 + HCl$$

(with carbonyl =O on S)

The polyhaloethyl sulfinyl chloride, e.g. 1,2,2-trichloroethyl sulfinyl chloride, 1,2,2,2-tetrachloroethyl sulfinyl chloride and 2,2,2-trichloroethyl sulfinyl chloride, or the polyhalovinyl sulfinyl chloride, e.g. 2,2-dichlorovinyl sulfinyl chloride, perchlorovinyl sulfinyl chloride and 1,2-dichlorovinyl sulfinyl chloride starting material can be prepared as set forth in parent application, Ser. No. 584,104, filed Oct. 4, 1966.

As compounds having the formulae $R_2OH$ and $R_2SH$ there can be used alcohols, phenols, mercaptans and thiophenols such as methyl alcohol, ethyl alcohol, propyl alcohol, isopropyl alcohol, butyl alcohol, secondary butyl alcohol, octyl alcohol, secondary octyl alcohol, isooctyl alcohol, amyl alcohol, 2,2,2-trichloroethyl alcohol, ethylene chlorohydrin, propylene chlorohydrin, trimethylene chlorohydrin, 1,3-dichloro-2-propanol, ethylene bromohydrin, phenol, p-cresol, o-cresol, m-cresol, p-ethyl phenol, p-butyl phenol, p-t-butyl phenol, p-octyl phenol, 2,4,5-trichlorophenol, 4-chlorophenol, 2-methyl-4-chlorophenol, 2-4-dichloro phenol, methyl mercaptan, ethyl mercaptan, propyl mercaptan, butyl mercaptan, secondary butyl mercaptan, amyl mercaptan, isopropyl mercaptan, thiophenol, p-methyl thiophenol, p-t butyl thiophenol, 2,4,5-trichlorothiophenol, 2-methyl-4-chlorothiophenol.

In the case of phenols they are preferably reacted in the form of their alkali metal salts, e.g. as sodium phenates. It also was found more difficult to prepare pure products from the phenols and it was found that using the phenols, even as sodium phenates, the sulfinate products were contaminated with some free phenol. In contrast using alcohols or mercaptans or thiophenols pure products were readily obtained.

In the case of the alcohols the desired reaction went readily in either chloroform or in excess alcohol as a diluent. The use of a tertiary base to aid the reaction in most cases was not required but such bases could be employed at low temperatures and in the presence of excess alcohol.

In the case of mercaptans precautions must be taken to obtain the thiosulfinates rather than disulfides. Thus when polar media, tertiary bases and alkali metal salts were used noticeable reduction of the $$\overset{S}{\underset{\underset{O}{\|}}{}}$$

group occurred. In chloroform, however, and without the use of base the mercaptans (both aliphatic and aromatic) reacted as desired to form the thiosulfinates.

Examples of compounds within the present invention are 2,2,2-trichloroethyl-1′,2′,2′-trichloroethane sulfinate, methyl 2,2,2-trichloroethane sulfinate, ethyl 2,2,2-trichloroethane sulfinate, methyl 2,2-dichloroethene sulfinate, isopropyl 2,2,2-trichloroethane sulfinate, n-butyl 1,2,2,2-tetrachloroethane thiosulfinate, ethyl 2,2,2-trichloroethane sulfinate, isopropyl 1,2,2-trichloroethane sulfinate, methyl 1,2,2,2-tetrachloroethane sulfinate, butyl 1,2,2,2-tetrachloroethane sulfinate, secondary butyl 2,2,2-trichloroethane sulfinate, isooctyl 1,2,2-trichloroethane sulfinate, octyl 2,2,2-trichloroethane sulfinate, octyl 1,2,2,2-tetrachloroethane sulfinate, propyl 1,2,2-trichloroethane sulfinate, propyl 2,2,2-trichloroethane sulfinate, ethyl 2,2-dichloroethane sulfinate, propyl 2,2-dichloroethene sulfinate, isopropyl 2,2-dichloroethene sulfinate, butyl 2,2-dichloroethene sulfinate, amyl 1,2,2-trichloroethane sulfinate, amyl 2,2-dichloroethene sulfinate, isopropyl 1,2-dichloroethene sulfinate, amyl 1,2-dichloroethene sulfinate, octyl 2,2-dichloroethene sulfinate, methyl 1,2-dichloroethene sulfinate, 2,2,2-trichloroethyl 1′,2′-dichloroethene sulfinate, 2,2,2-trichloroethyl 2',2'-dichloroethene sulfinate, 2-chloroethyl 1',2',2'-trichloroethane sulfinate, 2-chloroethyl 2',2'-dichloroethene sulfinate, methyl 1,2,2-trichloroethene sulfinate, ethyl 1,2,2-trichloroethene sulfinate, propyl 1,2,2-trichloroethene sulfinate, hexyl 1,2,2-trichloroethene sulfinate, 1-chloropropyl 1',2',2'-trichloroethane sulfinate, 1-bromoethyl 2',2',2'-trichloroethane sulfinate, 1-bromoethyl 2',2',2'-trichloroethane sulfinate, 1-bromoethyl 2',2'-dichloroethene sulfinate, isopropyl 1,2,2-trichloroethene sulfinate, methyl 1,2,2-trichloroethane thiosulfinate, ethyl 1,2,2-trichloroethane thiosulfinate, isopropyl 1,2,2-trichloroethane thiosulfinate, butyl 1,2,2-trichloroethane thiosulfinate, octyl 1,2,2-trichloroethane thiosulfinate, amyl 1,2,2-trichloroethane thiosulfinate, methyl 2,2,2-trichloroethane thiosulfinate, ethyl 2,2,2-trichloroethane thiosulfinate, isopropyl 2,2,2-trichloroethane thiosulfinate, propyl 2,2,2-trichloroethane thiosulfinate, 2,2,2-trichloroethyl 2',2',2'-trichloroethane thiosulfinate, secondary butyl 2,2,2-trichloroethane thiosulfinate, octyl 2,2,2-trichloroethane thiosulfinate, methyl 1,2,2,2-tetrachloroethane thiosulfinate, octyl 1,2,2,2-tetrachloroethane thiosulfinate, methyl 1,2-dichloroethene thiosulfinate, ethyl 1,2-dichloroethene thiosulfinate, propyl 1,2-dichloroethene thiosulfinate, butyl 1,2-dichloroethene thiosulfinate, octyl 1,2-dichloroethene thiosulfinate, octyl 2,2-dichloroethene thiosulfinate, methyl 2,2-dichloroethene thiosulfinate, ethyl 2,2-dichloroethene thiosulfinate, 2,2,2-trichloroethyl 2,2-dichloroethene thiosulfinate, propyl 2,2-dichloroethene thiosulfinate, n-butyl 1,2,2-trichloroethene thiosulfinate, methyl 1,2,2-trichloroethene thiosulfinate, phenyl 1,2,2-trichloroethane sulfinate, phenyl 2,2,2-trichloroethane sulfinate, phenyl 1,2,2,2-tetrachloroethane sulfinate, phenyl 1,2-dichloroethene sulfinate, phenyl 2,2-dichloroethene sulfinate, phenyl 1,2,2-trichloroethene sulfinate, phenyl 1,2,2-trichloroethene thiosulfinate, phenyl 2,2,2-trichloroethane thiosulfinate, phenyl 1,2,2,2-tetrachloroethane thiosulfinate, phenyl 1,2-dichloroethene thiosulfinate, phenyl 2,2-dichloroethene thiosulfinate, phenyl 1,2,2-trichloroethene thiosulfinate, p-cresyl 1,2,2-trichloroethane sulfinate, m-cresyl 2,2,2-trichloroethane sulfinate, o-cresyl 1,2-dichloroethene sulfinate, p-cresyl 2,2-dichloroethene sulfinate, p-cresyl 1,2,2-trichloroethene sulfinate, p-cresyl 1,2,2,2-tetrachloroethane thiosulfinate, p-cresyl 2,2,2-trichloroethane thiosulfinate, p-cresyl 2,2-dichloroethene sulfinate, 2,4,5-trichlorophenyl 1,2,2-trichloroethane sulfinate, 2-methyl-4-chlorophenyl 1,2,2-trichloroethane sulfinate, 4-chlorophenyl 2,2,2-trichloroethane sulfinate, 2-methyl-4-chlorophenyl 2,2,2-trichloroethane sulfinate, 2,4,5-trichlorophenyl 2,2,2-trichloroethane sulfinate, 2-methyl-4-chlorophenyl 1,2,2,2-tetrachloroethane sulfinate, 2-methyl-4-chlorophenyl 1,2,2-trichloroethene sulfinate, 2,4,5-trichlorophenyl 2,2-dichloroethene sulfinate, 2,4-dichlorophenyl 1,2-dichloroethene sulfinate, p-cresyl 1,2,2-trichloroethane thiosulfinate, 4-chlorophenyl 1,2,2-trichloroethane thiosulfinate, p-t-butylphenyl 1,2,2-trichloroethane thiosulfinate, p-octylphenyl 1,2,2-trichloroethane thiosulfinate, 2,4,5-trichlorophenyl 1,2,2-trichloroethane thiosulfinate, 4-chlorophenyl 2,2,2-trichloroethane thiosulfinate p-t-butylphenyl 2,2,2-trichloroethane thiosulfinate, 4-chlorophenyl 1,2,2,2-tetrachloroethane thiosulfinate, 4-chlorophenyl 1,2-dichloroethene thiosulfinate, 4-chlorophenyl 2,2-dichloroethene thiosulfinate, t-butylphenyl 2,2-dichloroethene thiosulfinate, 4-chlorophenyl 1,2,2-trichloroethene thiosulfinate.

The sulfinates and thiosulfinates of Formulae I and II are extremely useful as nemotocides, fungicides and bactericides. Thus they have shown nematocidal activity against saprophytic nematodes such as Panagrellus and Rhabditis spp. and parasitic nematodes such as Meloidogyne spp. They have also been found to be fungicides in tests against *Ceratocystis ulmi, Colletotrichum obiculare, Fusarium, Helminthosporium sativum, Rhizoctonia solani, Verticillium alboatrum, Pythium irregulare* and Alternaria. They also showed some desiccant activity for cotton as well as mild pre and post emergent herbicide activity in tests on oats, wheat, flax, radishes and sugar beets.

The unsaturated esters and thioesters within Formulae I and II can also be formed by dehydrochlorination of the corresponding saturated esters. However, purer products are obtained by reacting the appropriate alcohol, phenol or mercaptan with the polyhalovinyl sulfinyl chloride.

EXAMPLE 1

7377.—Methyl-1,2,2-trichloroethane sulfinate

To 10.8 g. (0.05 M) of 1,2,2-trichloroethyl sulfinyl chloride (5695) 25 ml. of dry MeOH (large excess) were added dropwise and the temperature allowed to rise to 35° C. Finally the mixture was kept at a gentle reflux for 3 hours until most of the HCl evolution ceased.

Direct evaporation in high vacuum gave 11.0 g. (quant. yield) of 7377 as light yellow oil, $n_D^{26}$ 1.5127.

EXAMPLE 2

7378.—Ethyl-1,2,2-trichloroethane sulfinate 10.8 g. (0.05 M) of 1,2,2-trichloroethyl sulfinyl chloride were added dropwise to 25 ml. (large excess) of absolute ethyl alcohol and the temperature allowed to rise. Additional heating at reflux for 3 hours are applied to complete the reaction.

Removal of all volatiles in high vacuum gave 11.2 g. (quant. yield) of 7378, $n_D^{26}$ 1.5046.

EXAMPLE 3

6407.—2,2,2-trichloroethyl-1,2,2-trichloroethane sulfinate 14.9 g. (0.1 M) of redistilled 2,2,2-trichloroethyl alcohol were mixed directly with 10.8 g. (0.05 M) of 1,2,2-trichloroethyl sulfinyl chloride at room temperature. As no exothermic reaction was observed, the mixture was heated to 80–90° C. and kept at this temperature in a dry nitrogen atmosphere for approximately 1 hour, until most of the hydrogen chloride formed was expelled. Cooling the mixture, extracting with 5 volumes of water (CH$_2$Cl$_2$ was used as solvent), drying of the heavy organic layer over MgSO$_4$, stripping and distillation gave 10.0 g. (about 60% yield) of 6407 as a colorless oil, B.$_{0.6}$ 130–5° C., $n_D^{23}$ 1.5181.

EXAMPLE 4

5835.—Isopropyl-1,2,2-trichloroethane sulfinate

Somewhat more than 6 g. (0.1 M) of isopropyl alcohol were dissolved in 100 ml. of dry CHCl$_3$ and 21.6 g. (0.1 M) of 1,2,2-trichloroethyl sulfinyl chloride were added dropwise. The temperature rose to 40° C. over the 10 minute addition time with evolution of HCl gas. Stirring and heating for 1 further hour and stripping off all volatiles gave 23.0 g. (97% yield) of crude 5835, $n_D^{23}$ 1.5007.

Distillation of 10 g. gave 8.5 g. of pure compound 5835, $n_D^{23}$ 1.4966, B.$_{0.05}$ 69–71° C.

EXAMPLE 5

7034.—Methyl-2,2,2-trichloroethane sulfinate 21.6 g. (0.1 M) of 2,2,2-trichloroethyl sulfinyl chloride (5696) were added to 30 ml. (an excess) of dry methyl alcohol at 25–30° C. with slight cooling and allowed to stand overnight at room temperature.

Direct evaporation in high vacuum gave 20.0 g. (95% yield) of compound 7034 as a very faint greenish liquid, $n_D^{25}$ 1.5060, with an ester type odor. Percent Cl 50.0 calc., 50.1 fd.; percent S 15.1 calc., 15.1 fd.

EXAMPLE 6

7379.—Ethyl-2,2,2-trichloroethane sulfinate 20.0 g. (0.093 M) of 2,2,2-trichloroethyl sulfinyl chloride were added to approximately 50 ml. of absolute ethyl alcohol at room temperature. The material was refluxed for 1 hour to complete the reaction.

The whole mixture was evaporated in high vacuum and 20.5 g. (98% yield) of 7379 were obtained as an almost colorless liquid, $n_D^{24}$ 1.4960, having an ester type odor. Percent Cl 47.1 calc., 46.5 fd.; percent S 14.2 calc., 14.0 fd.

EXAMPLE 7

7066.—Isopropyl-2,2,2-trichloroethyl sulfinate

To 21.6 g. (0.1 M) of 2,2,2-trichloroethyl sulfinyl chloride in 200 ml. of dry petroleum ether 7.0 g. (about 10% excess) of isopropyl alcohol were added and stirred for approximately 10 minutes at 5–10° C. in an ice-water bath before 10.2 g. (0.1 M) of triethyl amine in 10 ml. of petroleum ether were added dropwise over a period of 30 minutes. The reaction was instantaneous but the mixture was allowed to stir at room temperature for 1 further hour. Washing with HCl, dilute NaHCO₃ and drying of the obtained solution over MgSO₄ gave after high vacuum stripping 22.5 g. (94% yield) of 7066 as a colorless liquid, $n_D^{28}$ 1.4912. Percent Cl 44.3 calc., 44.9 fd.; percent S 13.4 calc., 13.6 fd.

The tertiary base should be used after the alcohol and the sulfinyl chloride have come into contact. Isopropyl alcohol can also be reacted in the fashion as described in Example 5 to yield the desired ester.

EXAMPLE 8

7233.—Isopropyl-1,2,2,2-tetrachloroethane sulfinate 15.0 g. (0.06 M) of 1,2,2,2-tetrachloroethyl sulfinyl chloride (5697) were diluted with 50 ml. (a large excess) of isopropyl alcohol and 1 g. of powdered anhydrous aluminum chloride were added; the reaction was slightly exothermic, the temperature of the mixture reached 35° C. but no evolution of HCl gas was noted. The mixture therefore was refluxed for 2½ hours with HCl evolution and allowed to stir overnight at room temperature.

The mixture was poured into water, the product taken up with CCl₄, dried over MgSO₄ and vacuum stripped. 11 g. (67% yield) of 7233 were obtained, $n_D^{23}$ 1.5090.

EXAMPLE 9

5880.—Isopropyl-1,2-dichloroethene sulfinate 12 g. (0.05 M) of isopropyl-1,2,2-trichloroethane sulfinate were dissolved in 100 ml. of dry benzene and 5.1 g. (0.05 M) of triethyl amine in 20 ml. of benzene were added dropwise with stirring at room temperature. The reaction temperature was allowed to reach 40° C. The resulting mixture was allowed to stand several days at room temperature. (Such standing is not essential.) Filtration gave 7.5 g. (quant. yield) of Et₃NHCl and the filtrate after high vacuum stripping gave 9.0 g. (85% yield) of 5880 as a dark oil. Percent Cl 34.9 calc., 34.6 fd.; percent S 15.7 calc., 15.5 fd.

EXAMPLE 10

7049.—Methyl-2,2-dichloroethene sulfinate

By dehydrochlorination of methyl-2,2,2-trichloroethane sulfinate (7034).—6.3 g. (0.03 M) of compound 7034 were dissolved in 50 ml. of 1:1:1 (by volume) tetrahydrofuran:benzene:petroleum ether and reacted with 3 g. (0.03 M) of triethyl amine by dropwise adding of the latter with stirring at room temperature and finally at 50° C. and holding at this temperature for 1 further hour. 4.0 g. (quant. recovery) of Et₃NHCl were recovered by filtration and a deep yellow oil was obtained as the residue after high vacuum stripping.

5.0 g. (95% yield) of 7049 were obtained, $n_D^{29}$ 1.5110. This product was not as pure as that obtained in Example 11.

EXAMPLE 11

7049.—Methyl-2,2-dichloroethene sulfinate

By reaction of methyl alcohol with 5699 (2,2-dichlorovinyl sulfinyl chloride).—17.9 g. (0.1 M) of compound 5699 were added to 30 ml. of dry methyl alcohol at 20–25° C. (external cooling with cold water) and the resulting mixture refluxed for 1 hour. By the end of this heating period the HCl evolution practically creased. The mixture was allowed to stand overnight at room temperature and high vacuum evaporation gave 15 g. (86% yield) of compound 7049 as a pale yellow liquid, $n_D^{25}$ 1.5296, percent Cl 40.6 calc., 40.4 fd.

EXAMPLE 12

7067.—Isopropyl-2,2-dichloroethene sulfinate

By dehydrochlorination of isopropyl-2,2,2-dichloroethane sulfinate (7066).—14.3 g. (0.06 M) of compound 7066 were diluted with 100 ml. of dry benzene and 6.0 g. (0.06 M) of triethyl amine in 10 ml. of benzene were added dropwise with stirring and occasional cooling. 50 ml. of tetrahydrofuran were added and the whole was allowed to stand for 48 hours at room temperature. 7.7 g. (94% recovery) of Et₃NHCl were recovered by filtration and 11.5 g. (94.5% yield) of compound 7067 were obtained as the residue after high vacuum evaporation of the filtrate, $n_D^{30}$ 1.4920, percent Cl 35.0 calc., 34.7 fd.; percent S 15.7 calc., 15.4 fd.

EXAMPLE 13

7234.—Isopropyl-perchloroethene sulfinate (1) By dehydrochlorination of 1,2,2,2-tetrachloroethane sulfinate (7233).—10 g. (0.036 M) of compound 7233 were dissolved in 150 ml. of petroleum ether and 3.6 g. (0.036 M) of triethyl amine in 10 ml. of petroleum ether were added dropwise with stirring at room temperature. The whole mixture was heated at 40° C. for 1 further hour and the formed Et₃NHCl removed by filtration.

The residue after high vacuum treatment of the filtrate amounted to 7.5 (88% yield) of compound 7234 as a dark oil, percent Cl 44.8 calc., 44.4 fd.

EXAMPLE 14

7234.—Isopropyl perchloroethene sulfinate (2) Directly by reacting isopropyl alcohol with perchlorovinyl sulfinyl chloride (5700).—6.0 g. (0.028 M) of compound 5700 were placed in a 50 ml. flask, the stirrer started and 20 ml. of isopropanol added at once without cooling. The exothermic reaction was quenched by the large excess of isopropyl alcohol used. Dilution with 20 ml. of CHCl₃ and heating at 65° C. for 30 minutes was applied. High vacuum stripping gave 6.0 g. (90% yield) of very pure compound 7234 as a pale yellow oil, $n_D^{24}$ 1.5155.

EXAMPLE 15

5729.—2,4,5-trichlorophenyl-1,2,2-trichloroethane sulfinate 1.15 g. sodium metal was dispersed in toluene at 110° C. and 9.85 g. (0.05 M) of 2,4,5-trichlorophenol added and the resulting mixture refluxed for 2 hours. The formed sodium-phenate was filtered, washed with fresh benzene and re-suspended in benzene. 10.8 g. (0.05 M) of 1,2,2-trichloroethyl sulfinyl chloride in 10 ml. of dry toluene were then added dropwise with stirring. The NaCl formation was rapid and occurred while rendering the solution yellow. Filtering off NaCl and high vacuum evaporation gave 14 g. (75% yield) of compound 5729 which appeared to be contaminated with some free 2,4,5-trichlorophenol, percent Cl 56.5 calc., 57.0 fd.; percent S 8.5 calc., 8.0 fd.

EXAMPLE 16

5888.—2-methyl-4-chlorophenyl-1,2,2-trichloroethane sulfinate 1.15 g. (0.05 M) of sodium metal were dispersed in 50 ml. of dry toluene at approximately 110° C. and 7.2 g. (0.05 M) of 2-methyl-4-chlorophenol in 50 ml. of toluene were added at this temperature. Two further hours of heating at reflux was applied in order to complete the salt formation. The salt was filtered, washed with benzene and re-suspended in benzene. 10.8 g. (0.05 M) of 1,2,2-trichloroethyl sulfinyl chloride were added to this suspension at approximately 10° C. The NaCl formation was rapid and complete after a further 30 minutes stirring at room temperature. Filtration and high vacuum stripping of the filtrate gave 15.5 g. (85% yield) of compound 5888 as oil, $n_D^{25}$ 1.5650.

EXAMPLE 17

7401.—Phenyl-2,2,2-trichloroethane sulfinate

A solution of 9.4 g. (0.1 M) of phenol in 30 ml. of $CHCl_3$ was added to 25 g. (0.115 M) of 2,2,2-trichloroethyl sulfinyl chloride in 50 ml. of $CHCl_3$ at room temperature. When the mixture was heated to 70° C. a vigorous evolution of HCl gas occurred. Refluxing the mixture until the HCl evolution subsided and direct stripping in high vacuum gave compound 7401 which contained some free phenol.

EXAMPLE 18

5839.—2-methyl-4-chlorophenyl-2,2,2-trichloroethane sulfinate

To 7.1 g. (0.05 M) of 2-methyl-4-chlorophenol in 30 ml. of $CHCl_3$ 10.8 g. (0.05 M) of 2,2,2-trichloroethyl sulfinyl chloride in 10 ml. of $CHCl_3$ were added dropwise finally at 35° C.; heating at 40–5° C. for ½ hour was applied and the whole was stripped.

16 g. (almost quant. yield) of a dark red liquid were obtained which contained a considerable amount of the free 2-methyl-4-chlorophenol, $n_D^{23}$ 1.5448. In order to reduce the amount of free phenol, this product was then heated without solvent and in presence of additional quantities of 5696 at 120–5° C. for 4 hours in a slow stream of dry nitrogen. The resulting infra red curve did not show a greatly improved purity.

Finally the product was washed with dilute NaOH, dilute $NaHCO_3$, cooled and decolorized over charcoal.

A dark oil was obtained, which was still contaminated with considerable amounts of free phenol.

EXAMPLE 19

7235.—2-methyl-4-chlorophenyl-1,2,2,2-tetrachloroethane sulfinate 2.3 g. (0.1 M) of sodium were dispersed in toluene at 110° C. and 14.2 g. (0.1 M) of 2-methyl-4-chlorophenol in toluene added at that temperature. To complete the salt formation 30 minutes further heating was applied and the suspended salt allowed to stand overnight. Two more hours refluxing, cooling of the suspension to 0–5° C. and adding with stirring of 25 g. (0.1 M) of 1,2,2,2-tetrachloroethyl sulfinyl chloride gave a mixture which was allowed to warm to room temperature. The reaction took place smoothly forming NaCl readily. Heating to 55° C. for 1 hour and cooling with a trace of added water gave a more granular NaCl which was easy to filter. Washing with water, drying over $MgSO_4$ and stripping gave 31.5 g. (88% yield) of compound 7235 as a dark brown oil containing some free phenol.

This material was subjected to chromatography on Florisil using n-heptane as solvent.

A somewhat purified product (IR 19a) was obtained although there was a considerable loss in yield.

EXAMPLE 20

5778.—Methyl-1,2,2-trichloroethane thiosulfinate 4.32 g. (0.02 M) of 1,2,2-trichloroethyl sulfinyl chloride were diluted with 50 ml. of dry $CHCl_3$ and 1.5 g. (0.02 M+excess) of methyl mercaptan gas were introduced with stirring and moderate cooling. The reaction was mildly exothermic but was completed by refluxing until no more HCl gas was evolved. $MgSO_4$ (2 g.) were added during the operation to ensure absence of moisture. High vacuum stripping gave 3.8 g. (85% yield) of compound 5778 as a light yellow oil, $n_D^{25}$ 1.5542.

EXAMPLE 21

7036.—Ethyl-1,2,2-trichloroethane thiosulfinate 4.22 g. (0.02 M) of 1,2,2,-trichloroethyl sulfinyl chloride were dissolved in 30 ml. of dry $CHCl_3$ and 1.5 g. (0.02 M, 20% excess) of ethyl mercaptan in 10 ml. of $CHCl_3$ were added over a period of 5 minutes. The temperature reached 40° C. and HCl evolution was considerable. Holding at 60° C. for 1 hour, filtration over $MgSO_4$ and stripping in high vacuum gave 4.5 g. (93% yield) of compound 7036, $n_D^{24}$ 1.5500 as an almost colorless liquid.

EXAMPLE 21(a)

Proceeding as in Example 21 but using petroleum ether as solvent gave an 88% yield of compound 7036, $n_D^{26}$ 1.5533. It was identical with the product of Example 21.

EXAMPLE 22

5836.—Isopropyl-1,2,2-trichloroethane thiosulfinate

To 7.6 g. (0.1 M) of isopropyl mercaptan in 100 ml. of dry $CHCl_3$ 21.6 g. (0.1 M) of 1,2,2-trichloroethyl sulfinyl chloride were added dropwise, allowing the temperature to rise to 45° C. Heating under continuous evolution of HCl gas at 50° C. for a further 30 minutes, filtration over $MgSO_4$ and evaporation in high vacuum gave 25.5 g. (99%) of compound 5836 as an almost colorless oil, $n_D^{23}$ 1.5787 B.P.$_{0.03}$ 65–70° C.

EXAMPLE 23

7035.—Methyl-2,2,2-trichloroethane thiosulfinate

Into a solution of 21.6 g. (0.1 M) of 2,2,2-trichloroethyl sulfinyl chloride in 30 ml. of benzene and 30 ml. of tetrahydrofuran 10 g. (more than twice the calculated amount) of methyl mercaptan gas were absorbed at room temperature. When some 6 g. of methyl mercaptan were introduced a more noticeable temperature rise occurred but the tempeature was kept below 35° C. by means of a cold water bath. The mixture was then kept at 45° C. for 1 further hour and allowed to stand overnight. Complete stripping of all volatiles in high vacuum gave 21.0 g. (92%) of compound 7035 as a light oil, $n_D^{25}$ 1.5445.

EXAMPLE 24

6038.—Ethyl-2,2,2-trichloroethane thiosulfinate 8.64 g. (0.04 M) of 2,2,2-trichloroethyl sulfinyl chloride were diluted with 40 ml. of dry $CHCl_3$ and a solution of 3.0 g. (0.04 M, excess) of ethyl mercaptan in 20 ml. of $CHCl_3$ was added dropwise with stirring at room temperature. At the end of the addition period (15 minutes) the temperature reached 38° C. After a further ½ hour's stirring under vigorous evolution of HCl gas, some $MgSO_4$ was added to the stirred mixture and refluxing was continued until the HCl evolution subsided. Filtration and high vacuum stripping gave 9 g. (94% yield) of compound 6038 as an almost colorless liquid, $n_D^{27}$ 1.5276.

EXAMPLE 25

6039.—Isopropyl-2,2,2-trichloroethane thiosulfinate 21.6 g. (0.1 M) of 2,2,2-trichloroethyl sulfinyl chloride were dissolved in a mixture of 50 ml. $CHCl_3$ and 50 ml. $CCl_4$ and 10 g. (about 30% excess) of freshly distilled isopropyl mercaptan added dropwise with stirring at below 30° C. Warming 30 minutes at 40° C. (strong HCl evolution), adding anhydrous $MgSO_4$ to the mixture and allowing to stand overnight at room temperature gave after filtration and high vacuum stripping 24.5 g. (96% yield) of compound 6039 as a faintly yellow liquid, $n_D^{24}$ 1.5250. Percent Cl 40.8 calc., 40.7 fd.; percent S 24.6 calc., 24.6 fd.

EXAMPLE 26

7231.—n-butyl-1,2,2,2-tetrachloroethane thiosulfinate 12.5 g. (0.05 M) of 1,2,2,2-tetrachloroethyl sulfinyl chloride (5697) were diluted with 50 ml. of dry $CHCl_3$ and 4.5 g. (0.05 M) of freshly distilled n-butyl mercaptan were added dropwise with stirring. The reaction temperature was allowed to reach 35° C., $MgSO_4$ was added and the mixture allowed to stand overnight at room temperature. Heating to gentle reflux until HCl evolution creased, filtration and stripping in high vacuum gave 15 g. (99% yield) of compound 7231 as an almost colorless liquid, $n_D^{25}$ 1.5344.

EXAMPLE 27

7071.—Ethyl-1,2-dichloroethene thiosulfinate (cis/trans-mixture) by dehydrochlorination 2.3 g. (0.0095 M) of ethyl-1,2,2-trichloroethane thiosulfinate were diluted with 15 ml. of dry CCl$_4$ and a solution of 1.0 g. (slight excess) of triethyl amine in 5 ml. of CCl$_4$ added. Heating to 80° C. for 30 minutes, washing of the resulting mixture 3 times with dilute HCl, drying over MgSO$_4$ and high vacuum stripping gave 1.7 g. of compound 7071 as a dark but mobile liquid (87% yield), $n_D^{25}$ 1.5550.

EXAMPLE 28

7068.—Ethyl-2,2-dichloroethene thiosulfinate (1) By direct method.—6.4 g. (0.04 M) of 2,2-dichlorovinyl sulfinyl chloride (5699) were diluted with 40 ml. of dry CHCl$_3$ and 3.0 g. (0.04 M, 20% excess) of ethyl mercaptan in 20 ml. of CHCl$_3$ were added at room temperature and the temperature was allowed to rise to 40° C. After completed addition of the reagent, the orange solution appeared colorless. Refluxing the mixture to expel most of the HCl filtration through MgSO$_4$ and high vacuum stripping gave 5.5 g. (69% yield) of compound 7068 as a yellow oil, $n_D^{27}$ 1.5409.

(2) By dehydrochlorination of ethyl - 2,2,2-trichloroethane thiosulfinate.—2.4 g. (0.1 M) of compound 6038 were diluted with 15 ml. of dry CCl$_4$ and 1.05 g. (slight excess) of triethyl amine in 5 ml. of CCl$_4$ were added. The temperature was allowed to rise to 33° C. Heating for 1 further hour to 80° C., washing 3 times with dilute HCl, drying over MgSO$_4$ and high vacuum stripping gave 1.8 g. (90% yield) of compound 7068 as a dark oil, $n_D^{26}$ 1.5337. This product was not as pure as that obtained by procedure (1).

EXAMPLE 29

7232.—n-butyl-perchloroethene thiosulfinate (1) By "direct" method.—5 g. (0.0234 M) of perchlorovinyl sulfinyl chloride (7500) were diluted with 20 ml. of dry CHCl$_3$ and 2.2 g. (slight excess) of n-butyl mercaptan in 10 ml. of CHCl$_3$ were added. The temperature was allowed to rise to 30–35° C. Refluxing for approximately 1 hour to expel all of the formed HCl, adding MgSO$_4$, filtering and evaporation in high vacuum gave 6.0 g. (96% yield), of compound 7232 as a yellow oil, $n_D^{24}$ 1.5260.

(2) By dehydrochlorination of n-butyl - 1,2,2,2-tetrachloroethane thiosulfinate.—3.0 g. (0.01 M) of compound 7231 were taken up into 15 ml. of dry CCl$_4$ and a solution of 1.05 g. (slight excess) of triethyl amine in 5 ml. of CCl$_4$ added dropwise with stirring while allowing the temperature to rise to 37° C. Heating the mixture for 1 additional hour at 80° C., washing with dilute HCl (3 times), drying over anhydrous MgSO$_4$ and high vacuum stripping gave 2.3 g. (89% yield) of compound 7232 as a yellow oil, $n_D^{26}$ 1.5377.

EXAMPLE 30

5735.—p-chlorophenyl-1,2,2-trichloroethane thiosulfinate

A solution of 7.2 g. (0.05 M) of p-chlorothiophenol in 20 ml. of dry CHCl$_3$ was added to 10.8 g. (0.05 M) of 1,2,2-trichloroethyl sulfinyl chloride in 30 ml. of dry CHCl$_3$. The temperature rose to 30° C. on its own accord but was raised to reflux and maintained for seven hours (HCl ceased to be evolved). Filtration through MgSO$_4$ and high vacuum stripping gave 16.0 g. (quant. yield) of compound 5735 as a yellow oil, $n_D^{25}$ 1.5991.

EXAMPLE 31

7426.—p-tolyl-1,2,2-trichloroethane thiosulfinate 5 g. (0.04 M) of p-toluene thiol in 20 ml. of CHCl$_3$ were added to 9.0 g. (0.042 M) of 1,2,2-trichloroethyl sulfinyl chloride in 30 ml. of dry CHCl$_3$ and the temperature allowed to rise to 30° C. on its own accord. In order to complete the reaction, the mixture was refluxed for 7 hours (HCl evolution comes to a halt). Drying over anhydrous MgSO$_4$ and high vacuum evaporation of the filtrate gave 11.0 g. (91% yield) of compound 7426 as a light brown oil, $n_D^{26}$ 1.5878.

EXAMPLE 32

5736.—p-chlorophenyl-2,2,2-trichloroethane thiosulfinate

To 7.22 g. (0.05 M) of p-chlorothiophenol dissolved in 30–50 ml. of dry CHCl$_3$ 11.8 g. (0.05 M, 0.2 g. excess) of 2,2,2-trichloroethyl sulfinyl chloride in 20 ml. of dry CHCl$_3$ were added at a rapid rate and the mixture slowly warmed to beginning reflux (strong HCl evolution). After a standing period overnight refluxing was continued for approximately 5 hours. By that time the HCl evolution had practically stopped. Filtration through anhydrous MgSO$_4$ and high vacuum evaporation gave 15.5 g. (96% yield) of compound 5736 as a light yellow oil, $n_D^{25}$ 1.5904.

EXAMPLE 33

7427.—p-tolyl-2,2,2-trichloroethane thiosulfinate 14.8 g. (0.12 M) of p-toluene thiol were dissolved in 100 ml. of dry CHCl$_3$ and 26 g. (slight excess of 2,2,2-trichloroethyl sulfinyl chloride, diluted with 50 ml. of dry CHCl$_3$ added. Refluxing for a short while (strong HCl evolution) standing overnight at room temperature following by a 5 hour reflux period, filtration through MgSO$_4$ and high vacuum evaporation gave 29.0 g. (81% yield) of compound 7427 as a light yellow oil, $n_D^{24}$ 1.5887.

EXAMPLE 34

7428.—p-chlorophenyl-1,2-dichloroethane thiosulfinate

By dehydrochlorination of 5735 (p-chlorophenyl-1,2,2-trichloroethane thiosulfinate).—10 g. (0.031 M) of compound 5735 were dissolved in 40 ml. of dry CCl$_4$ and a solution of 3.1 g. (0.031 M) of triethyl amine in 10 ml. CCl$_4$ added dropwise with stirring while allowing the temperature to rise to 35° C. on its own accord. Further heating to 80° C. for 1.5 hours washing with dilute HCl (2 times) and drying over MgSO$_4$ gave after high vacuum stripping 6.5 g. (74% yield) of dark, red mobile compound 7428 as a liquid, $n_D^{25}$ 1.6220.

EXAMPLE 35

7429.—p-tolyl-2,2-dichloroethene thiosulfinate (1) By dehydrochlorination of 7427 (p-tolyl-2,2,2-trichloroethane thiosulfinate).—To 19 g. (0.063 M) of compound 7427 in 100 ml. of dry CCl$_4$ 7.0 g. (0.063 M, 10% excess) of triethyl amine in 20 ml. of CCl$_4$ were added dropwise with stirring, allowing the temperature to rise on its own accord. After complete addition the mixture had a temperature of 30° C. Standing overnight at room temperature and heating to 80° C. for 30 minutes completed the reaction. Washing the mixture 3 times with dilute HCl, drying over anhydrous MgSO$_4$ and high vacuum stripping of the filtrate gave 16.6 g. (99% yield) of compound 7429 as a dark orange oil, $n_D^{25}$ 1.5965.

(2) By direct method from p-toluene thiol and 5699 (2,2-dichlorovinyl sulfinyl chloride).—2.5 g. (0.02 M) of p-toluene thiol in 20 ml. of CHCl$_3$ were added to 3.5 g. (0.2 M) of compound 5699 in 30 ml. of CHCl$_3$. The temperature reached 38° C. on its own accord. Refluxing for 5 hours was applied to expel all the HCl gas. Drying by filtration over MgSO$_4$ and high vacuum evaporation gave 6.0 g. of compound 7429 as a yellow oil, $n_D^{26}$ 1.5965.

Infrared analysis showed that the product of Example 35(2) was purer than that of Example 35(1). The reason appears to be because dehydrochlorination was incomplete, leaving some saturated starting material in the end product.

The compounds of the present invention are generally mobile to viscous liquids of colorless ranging from almost colorless to dark yellow or brown. They do not possess objectionable odors and are miscible with many organic solvents. They have good shelf stability, are inert to water and most aqueous solutions but are sensitive toward alkalis.

The compounds have shown utility as nematocides, fungicides, defoliants, desiccants, herbicides and insecticides, the degree of activity varying from compound to compound.

The compounds of the present invention can be used alone but it is frequently desirable to add them to the pest, e.g. to the soil habitat of nematodes, or the plants, together with inert solids to form dusts, or dispersed in suitable liquid diluents, e.g. water. There can also be added surface active agents and inert solids in such liquid formulations. Desirably, 0.05 to 1% by weight of surface active agent is employed. The active ingredient can be from 0.01 to 99% by weight of the entire composition in such cases.

In place of water there can be employed organic solvents, e.g. hydrocarbons such as benzene, toluene, xylene, kerosene, diesel oil, fuel oil, and petroleum naphtha, ketones such as acetone, methyl ethyl ketone and cyclohexanone, alcohols, e.g. ethanol, isopropanol and amyl alcohol, etc.

There can also be added inert pesticidal or defoliant adjuvants such as talc, pyrophyllite, synthetic fine silica, Attaclay kieselguhr, chalk, diatomaceous earth, bentonite, fuller's earth, cottonseed hulls, wheat flour, soyabean flour, pumice, tripoli, wood flour, walnut shell flour, redwood flour and lignin.

It is frequently desirable to incorporate a surface active agent in the composition of the invention. The surface active agent can be anionic, cationic or nonionic.

In the specification, the following abbreviations are employed:

*C. Ulmi* for *Ceratocystis ulmi*
*Coll Obic.* for *Collectotrichum obiculare*
*Fu lyco.* for *Fusarium lycopersici*
*Fu niv.* for *Fusarium nivale*
*Hel sat.* for *Helminthosporium sativum*
*Rhiz sol.* for *Rhizoctonia solani*
*Vert. Alb.* for *Verticillium albo-atrum*
*Py* for *Pythium irregulare*
Fu for Fusarium
Rhiz for Rhizoctonia
Vert for Verticillium
Alt for Alternari
Ust for Ustilago
NESA for a mixture of Panagrellus spp. and Rhabelitis spp.
NEPA for Meloidogyne spp.
Ph for Phytotoxic

EXAMPLE 36

The compounds were tested as fungicides in plate fungicide tests by adding the compounds to agar cultures of the indicated fungi. The tests were carried out at rates of 500 p.p.m., 100 p.p.m. and 10 p.p.m. (in descending order) as shown in Table 1. In the table, 10 indicates 100% effectiveness and 0 indicates no effectiveness. In those cases where there was no effectiveness at the highest rate tested the compounds would be effective at higher rates of application.

TABLE 1

| Compound | C. Ulmi | Coll Obic. | Fu cyco. | Fu Niv. | Hel sat. | Rhiz sol. | Vert alb. | Py | Example |
|---|---|---|---|---|---|---|---|---|---|
| 5835 |  |  | 10 |  | 10 | 10 |  | 10 | 4 |
|  |  |  | 10 |  | 10 | 10 |  | 10 |  |
|  |  |  | 10 |  | 10 | 5 |  | 5 |  |
| 7034 | 2 | 0 | 0 | 0 | 0 | 0 | 0 |  | 5 |
|  | 0 | 0 | 0 | 0 | 0 | 0 | 0 |  |  |
|  | 0 | 0 | 0 | 0 | 0 | 0 | 0 |  |  |
| 7066 | 5 | 0 | 10 | 0 | 0 | 0 | 0 |  | 7 |
|  | 0 | 0 | 0 | 0 | 0 | 0 | 0 |  |  |
|  | 0 | 0 | 0 | 0 | 0 | 0 | 0 |  |  |
| 7067 | 10 | 10 | 10 | 10 | 10 | 10 | 10 |  | 12 |
|  | 5 | 10 | 0 | 10 | 5 | 2 | 5 |  |  |
|  | 0 | 0 | 0 | 0 | 0 | 0 | 0 |  |  |
| 5729 |  |  | 10 |  | 10 | 10 |  | 10 | 15 |
|  |  |  | 10 |  | 10 | 10 |  | 10 |  |
|  |  |  | 10 |  | 10 | 10 |  | 8 |  |
| 5730 |  |  | 10 |  | 10 | 10 |  | 10 |  |
|  |  |  | 10 |  | 10 | 10 |  | 10 |  |
|  |  |  | 10 |  | 10 | 10 |  | 10 |  |
| 5839 |  |  | 10 |  | 10 | 10 |  | 10 | 18 |
|  |  |  | 8 |  | 10 | 10 |  | 10 |  |
|  |  |  | 0 |  | 0 | 0 |  | 5 |  |
| 5836 | 10 |  | 10 |  | 10 | 10 |  | 10 | 22 |
|  | 10 |  | 10 |  | 10 | 10 |  | 10 |  |
|  | 8 |  | 10 |  | 10 | 10 |  | 8 |  |
| 7035 | 10 | 8 | 8 | 5 | 0 | 10 | 8 |  | 23 |
|  | 5 | 5 | 2 | 0 | 0 | 0 | 5 |  |  |
|  | 0 | 0 | 0 | 0 | 0 | 0 | 0 |  |  |
| 6038 | 10 | 10 | 10 |  | 10 | 10 | 10 |  | 24 |
|  | 10 | 10 | 8 |  | 5 | 5 | 8 |  |  |
|  | 8 | 5 | 5 |  | 5 | 5 | 5 |  |  |
| 7068 | 5 | 0 | 0 | 10 | 0 | 0 | 0 |  | 28 |
|  | 0 | 0 | 0 | 0 | 0 | 0 | 0 |  |  |
|  | 0 | 0 | 0 | 0 | 0 | 0 | 0 |  |  |
| 5741 |  |  | 10 |  | 10 | 10 |  | 10 |  |
|  |  |  | 10 |  | 10 | 10 |  | 10 |  |
|  |  |  | 5 |  | 8 | 0 |  | 0 |  |
| 5736 |  |  | 10 |  | 5 | 5 |  | 5 | 32 |
|  |  |  | 8 |  | 0 | 5 |  | 5 |  |
|  |  |  | 5 |  | 0 | 0 |  | 0 |  |
| 5742 |  |  | 8 |  | 5 |  | 5 | 5 |  |
|  |  |  | 5 |  | 0 |  | 0 | 0 |  |
|  |  |  | 0 |  | 0 |  | 0 | 0 |  |
| 5745 |  | 10 | 10 |  | 10 | 10 | 10 | 10 |  |
|  |  | 5 |  |  | 0 | 0 | 0 | 5 |  |
|  |  | 0 |  |  | 0 | 0 | 0 | 0 |  |

Compound 5730 is 2,4,5-trichlorophenyl 2',2',2'-trichloroethane sulfinate; compound 5741 is p-t-butylphenyl 1,2,2-trichloroethane thiosulfinate and compound 5745 is p-t-butylphenyl 2,2-dichloroethene thiosulfinate.

EXAMPLE 37

The compounds were also tested as soil fungicides by application to soil infested with pythium, as foliar fungicides against coll. obic. and as agents against spore germination against Alternaria and Ustilago. The soil fungicide tests were carried out at rates of 200 p.p.m. and 50 p.p.m., the foliage fungicide tests were carried out at rates of 1000 p.p.m., 100 p.p.m. and 10 p.p.m. and the spore germination tests were carried out at 500 p.p.m., 100 p.p.m. and 10 p.p.m. The results are set forth in Table 2. In the table 10 indicates 100% effectiveness and 0 indicates no effectiveness at the rate tested.

TABLE 2

| Compound: | Py | Coll. obic. | Alt. | Ust. | Example |
|---|---|---|---|---|---|
| 6407 | 2<br>0 | | 10<br>10<br>0 | 0<br>0<br>0 | 3 |
| 5835 | 2<br>0 | 5<br>0<br>0 | 0 | 0 | 4 |
| 7034 | 0<br>0 | | 5<br>0<br>0 | | 5 |
| 7066 | 0<br>0 | | 10<br>8<br>0 | | 7 |
| 7067 | 5<br>0 | | 10<br>10<br>5 | | 12 |
| 5729 | 10<br>8 | | 10<br>10<br>0 | 10<br>10<br>0 | 15 |
| 5730 | 4<br>0 | 5<br>0<br>0 | 0 | 0 | |
| 5839 | 7<br>0 | | 0<br>0 | 0 | 18 |
| 5836 | 9<br>9 | ph.<br>10<br>10 | 0 | 0 | 22 |
| 7035 | 5<br>0 | | 10<br>5<br>5 | | 23 |
| 6038 | 3<br>0 | | | | 24 |
| 7068 | 0<br>0 | | 10<br>10<br>10 | | 28 |
| 5741 | 6<br>3 | | 10<br>0<br>0 | 10<br>0<br>0 | |
| 5745 | 6<br>6 | | 0 | | |

EXAMPLE 38

The compounds were also tested as nematocides against both saprophytic and parasitic nematodes at the rates of test compound indicated in parts per million in Table 3. In the saprophytic nematode test (NESA) water was used as the medium with Panagrellus and Rhabditis spp. The formulation employed included 50% of the compound being tested, 46% silica, 2% sodium lignin sulfonate and 2% Pluronic L-61 (polyethylene oxide-propylene oxide adduct molecular weight about 1000). This formulation is designated Formulation A. (This same Formulation A was used in the fungicide tests described previously.) The results are given on a 0 to 10 scale with 10 indicating 100% kill and 0 indicating no kill.

In the parasitic nematode test (NEPA) the procedure was a 10 day contact test with Meloidogyne spp. in a water-agar medium in the presence of tomato roots at room temperature. The results are given on a 0 to 10 scale where 0 indicates the presence of severe knotting, i.e. no effectiveness and 10 indicates no knots, i.e. 100% effectiveness.

TABLE 3

| | NESA | | | | | | NEPA | | | | | |
|---|---|---|---|---|---|---|---|---|---|---|---|---|
| | 400 | 200 | 100 | 50 | 25 | 20 | 200 | 100 | 50 | 25 | 20 | Ex. |
| Compound: | | | | | | | | | | | | |
| 6407 | | | | | | | | 0 | 0 | | | 3 |
| 7034 | 10 | 0 | | 0 | 0 | 0 | | | | | 0 | 5 |
| 7379 | 0 | 0 | | 0 | 0 | | | | | | | 6 |
| 7066 | 8 | 8 | | 5 | 5 | | | | | | | 7 |
| 7233 | 10 | 10 | | 8 | | | | | | | | 8 |
| 5880 | 10 | 10 | | 10 | | | | | | | | 9 |
| 7049 | 10 | 8 | | 8 | | | | | | | | 10 |
| 7067 | 10 | 10 | | 8 | | | 10 | | | | | 12 |
| 7234 | 0 | 0 | | 0 | | | | | | | | 13 |
| 5729 | 10 | 10 | 10 | 8 | 5 | | | | 0 | 0 | | 15 |
| 5888 | 10 | 8 | | 0 | | | | | | | | 16 |
| 5730 | | 5 | 3 | 0 | | | | | 0 | 0 | | |
| 5839 | 10 | 10 | 10 | 5 | | | | | | | | 18 |
| 5778 | 10 | 8 | | 0 | | | | | | | | 20 |
| 7036 | 10 | 10 | | 10 | | | | | | | | 21 |
| 5836 | 10 | 10 | 10 | 10 | 10 | | | | 5 | 0 | | 22 |
| 7035 | 10 | 10 | | 8 | | | 10 | | | | | 23 |
| 6038 | 10 | 10 | | 10 | | | | | | | | 24 |
| 6039 | 10 | 10 | | 10 | | | | | | | | 25 |
| 7231 | 8 | 8 | | 8 | | | | | | | | 26 |
| 7071 | 10 | 10 | | 10 | | | | | | | | 27 |
| 7068 | 10 | 10 | | 10 | | | 5 | | | 0 | | 28 |
| 7232 | 0 | 0 | | 0 | | | | | | | | 29 |
| 5735 | 10 | 10 | | 0 | | | | | | | | 30 |
| 5741 | 10 | 10 | 10 | 8 | | | | | 0 | 0 | | |
| 5736 | | 5 | 3 | 0 | 0 | | | | 5 | 0 | | 32 |
| 5742 | | 3 | 0 | 0 | 0 | | | | 5 | 0 | | |
| 5745 | | 3 | 0 | 0 | 0 | | | | | | | |

EXAMPLE 39

The compounds were also tested as pre- and post-emergent herbicides. The only compounds tested showing pre-emergent herbicide activity were Compound 6038 which showed slight activity on oats, sugar beets, wheat, snap beans and corn, and Compound 7035 which showed activity on sugar beets and wheat. However, many of the compounds showed post-emergent herbicide effect. In some instances as shown in Table 4, the post-emergent herbicidal activity was selective. One gram of the test compound was diluted to 25 ml. with acetone and then sprayed on the plants in an amount to provide 8 pounds per acre or 2 pounds per acre of test compound. In Table 4, the top rate is 8 lbs./acre and the bottom rate 2 lbs./acre. The results are recorded on a 0–10 scale with 10 indicating 100% kill and 0 indicating no kill.

TABLE 4.—POST-EMERGENT HERBICIDE

| Compound | Oats | Sugar beets | Radish | Flax | Wheat | Example |
|---|---|---|---|---|---|---|
| 5835 | 0<br>0 | 5<br>3 | 3<br>3 | 0<br>0 | 0<br>0 | 4 |
| 7034 | 1<br>1 | 4<br>4 | 2<br>3 | 4<br>3 | 4<br>4 | 5 |
| 7066 | 0<br>0 | 3<br>1 | 3<br>3 | 2<br>1 | 1<br>0 | 7 |
| 7067 | 0<br>0 | 0<br>0 | 1<br>1 | 1<br>1 | 1<br>0 | 12 |
| 5729 | 6<br>2 | 8<br>7 | 7<br>5 | 7<br>1 | 4<br>2 | 15 |
| 5730 | 6<br>3 | 10<br>8 | 9<br>7 | 6<br>3 | 3<br>2 | |
| 5839 | 0<br>0 | 6<br>0 | 4<br>1 | 0<br>0 | 0<br>0 | 18 |
| 7036 | 0 | 1 | 1 | 1 | [1]0 | 21 |
| 5836 | 0<br>0 | 6<br>3 | 6<br>3 | 6<br>0 | 0<br>0 | 22 |
| 7035 | 4<br>3 | 3<br>3 | 4<br>4 | 4<br>4 | 4<br>3 | 23 |
| 6038 | 3<br>0 | 1<br>2 | 1<br>2 | 0<br>0 | 1<br>0 | 24 |
| 7068 | 0<br>0 | 4<br>3 | 3<br>2 | 4<br>2 | 2<br>0 | 28 |
| 5741 | 0<br>0 | 4<br>5 | 1<br>1 | 1<br>1 | 1<br>0 | |
| 5736 | 2<br>0 | 9<br>6 | 4<br>1 | 6<br>0 | 3<br>0 | 32 |
| 5742 | 0<br>0 | 3<br>0 | 2<br>1 | 0<br>0 | 0<br>0 | |
| 5745 | 0<br>0 | 3<br>0 | 0<br>0 | 0<br>0 | 0<br>0 | |

[1] 2 lbs./acre only.

EXAMPLE 40

The compounds were also tested as defoliants and desiccants. Activities in these areas were low. The compounds were tested on a 0 to 10 scale and compared with a commercial defoliant (S,S,S-tributyl trithiophosphate) and a commercial desiccant, arsenic acid. In Table 5 a reading of 2/8, for example, indicates an activity of the test compound of 2 compared to an activity of 8 for the commercial standard.

TABLE 5

| Compound | Defoliant 8 lbs./acre | Defoliant 2 lbs./acre | Desiccant 8 lbs./acre | Desiccant 2 lbs./acre | Example |
|---|---|---|---|---|---|
| 6407 | 0/9 | 0/8 | 3/6 | 2/6 | 3 |
| 7034 | 0/6 | 0/6 | 1/8 | 0/8 | 5 |
| 7066 |  |  | 1/8 | 0/8 | 7 |
| 7067 |  |  | 1/8 | 1/8 | 12 |
| 5839 | 2/8 | 0/7 |  |  | 18 |
| 5836 | 2/8 | 2/7 |  |  | 22 |
| 7035 | 0/6 | 0/6 | 1/8 | 2/8 | 23 |
| 7068 |  |  | 1/8 | 1/8 | 28 |
| 5735 | 3/8 | 0/7 |  |  | 30 |
| 5736 | 4/8 | 3/7 |  |  | 32 |
| 5742 | 1/8 | 0/7 |  |  |  |
| 5745 | 5/8 | 0/8 |  |  |  |

EXAMPLE 41

The compounds also exhibited mild insecticide activity as shown in Table 6. In the table the rates are in mmg. (micrograms)/dish. The top set of results is after 2 hours and the bottom set is after 18 hours. The results are given as amount of mortality, 0 being no kill and 10 indicating 100% kill.

TABLE 6

| Compound | Flour Beetle 1,000 | Flour Beetle 100 | Flour Beetle 10 | Housefly 1,000 | Housefly 100 | Housefly 10 | Example |
|---|---|---|---|---|---|---|---|
| 7379 | 1 | 0 | 0 | 0 | 0 | 0 | 6 |
|  | 1 | 0 | 0 | 1 | 1 | 0 |  |
| 7233 | 0 | 0 | 0 | 0 | 0 | 0 | 8 |
|  | 0 | 0 | 0 | 0 | 0 | 0 |  |
| 5880 | 0 | 0 | 0 | 1 | 1 | 0 | 9 |
|  | 0 | 0 | 0 | 1 | 1 | 0 |  |
| 7049 | 0 | 0 | 0 | 1 | 0 | 0 | 10 |
|  | 0 | 0 | 0 | 2 | 2 | 0 |  |
| 7234 | 0 | 0 | 0 | 0 | 0 | 0 | 13 |
|  | 0 | 0 | 0 | 1 | 0 | 0 |  |
| 5729 | 0 | 0 | 0 | 1 | 1 | 0 | 15 |
|  | 3 | 0 | 0 | 3 | 1 | 1 |  |
| 5888 | 0 | 0 | 0 | 1 | 0 | 0 | 16 |
|  | 10 | 0 | 0 | 2 | 0 | 0 |  |
| 5778 | 0 | 0 | 0 | 0 | 0 | 0 | 20 |
|  | 1 | 0 | 0 | 1 | 0 | 0 |  |
| 7036 | 0 | 0 | 0 | 1 | 0 | 0 | 21 |
|  | 0 | 0 | 0 | 1 | 1 | 0 |  |
| 7035 | 0 | 0 | 0 | 3 | 1 | 1 | 23 |
|  | 10 | 0 | 0 | 4 | 1 | 1 |  |
| 6038 | 0 | 0 | 0 | 1 | 0 | 0 | 24 |
|  | 0 | 0 | 0 | 2 | 2 | 1 |  |
| 7231 | 1 | 0 | 0 | 3 | 1 | 0 | 26 |
|  | 10 | 0 | 0 | 4 | 2 | 1 |  |
| 7071 | 0 | 0 | 0 | 0 | 0 | 0 | 27 |
|  | 0 | 0 | 0 | 1 | 1 | 0 |  |
| 7232 | 0 | 0 | 0 | 0 | 0 | 0 | 29 |
|  | 1 | 0 | 0 | 1 | 0 | 0 |  |
| 5735 | 0 | 0 | 0 | 0 | 0 | 0 | 30 |
|  | 6 | 0 | 0 | 6 | 2 | 1 |  |

Compound 5836 was the best in the fungicide and nematocide tests.

What is claimed is:

1. A compound having a formula selected from the group consisting of (1) 

and (2) 

where $R_1$ is tri to tetrahaloethyl or di to trihalovinyl, all halogen atoms being chlorine or bromine and $R_2$ is lower alkyl, mono, di or trihalogen lower alkyl, all halogens being chlorine or bromine, phenyl, lower alkyl phenyl, mono, di or trichlorophenyl and mono chloro mono lower alkyl phenyl.

2. A compound according to claim 1 wherein all the halogens are chlorine.

3. A compound according to claim 2 having Formula 1.

4. A compound according to claim 3 wherein $R_2$ is lower alkyl.

5. A compound according to claim 4 wherein $R_1$ is trichloroethyl.

6. A compound according to claim 3 wherein $R_2$ is a phenyl or lower alkyl phenyl.

7. A compound according to claim 3 wherein $R_2$ is chlorophenyl having 1 to 3 chlorine atoms or is mono chloro mono lower alkyl phenyl.

8. A compound according to claim 3 wherein $R_2$ is trichloro lower alkyl.

9. A compound according to claim 2 having Formula 2.

10. A compound according to claim 9 wherein $R_2$ is lower alkyl.

11. A compound according to claim 9 wherein $R_2$ is alkyl of 1 to 8 carbon atoms.

12. A compound according to claim 9 wherein $R_1$ is trichloroethyl.

13. A compound according to claim 9 wherein $R_2$ is phenyl or lower alkyl phenyl.

14. A compound according to claim 9 wherein $R_2$ is chlorophenyl having 1 to 3 chlorine atoms or is mono chloro mono lower alkyl phenyl.

15. A compound according to claim 9 wherein $R_2$ is trichloro lower alkyl.

References Cited

UNITED STATES PATENTS

| 3,395,232 | 7/1968 | White. |  |
|---|---|---|---|
| 2,508,745 | 5/1950 | Cavallito et al. | 260—453 |
| 2,632,698 | 3/1953 | Stewart | 71—103 |
| 3,138,519 | 6/1964 | Riden et al. | 71—103 |
| 3,200,146 | 8/1965 | Weil et al. | 260—453 X |
| 3,332,976 | 7/1967 | Freedman | 260—453 |

OTHER REFERENCES

Douglass, Index Chemicus, vol. 17, 52108 1965.

CHARLES B. PARKER, Primary Examiner

S. T. LAWRENCE III, Assistant Examiner

U.S. Cl. X.R.

71—72, 103; 260—456, 543; 424—303